(12) United States Patent
Bollinger et al.

(10) Patent No.: US 7,140,669 B2
(45) Date of Patent: *Nov. 28, 2006

(54) LINKAGE FOR A DRIVER'S CAB

(75) Inventors: Walter Bollinger, Winnenden (DE); Spencer Mckellip, Stuttgart (DE); Markus Ruehle, Aichwald (DE)

(73) Assignee: DaimlerChrysler AG, Stuttgart (DE)

( * ) Notice: Subject to any disclaimer, the term of this patent is extended or adjusted under 35 U.S.C. 154(b) by 43 days.

This patent is subject to a terminal disclaimer.

(21) Appl. No.: 10/514,109

(22) PCT Filed: Mar. 19, 2003

(86) PCT No.: PCT/EP03/02849

§ 371 (c)(1), (2), (4) Date: Jun. 13, 2005

(87) PCT Pub. No.: WO03/095291

PCT Pub. Date: Nov. 20, 2003

(65) Prior Publication Data

US 2005/0225119 A1 Oct. 13, 2005

(30) Foreign Application Priority Data

May 14, 2002 (DE) ................................ 102 21 346

(51) Int. Cl.
 *B60J 7/00* (2006.01)
(52) U.S. Cl. ............................. 296/190.07; 180/89.14; 180/89.15
(58) Field of Classification Search ........... 296/190.07; 180/89.14
 See application file for complete search history.

(56) References Cited

U.S. PATENT DOCUMENTS

| | | | | | |
|---|---|---|---|---|---|
| 2,210,519 | A | * | 8/1940 | Wollensak | ............... 180/89.15 |
| 2,699,223 | A | * | 1/1955 | Brumbaugh | ........... 296/190.06 |
| 3,039,557 | A | * | 6/1962 | Boyce et al. | ............. 180/89.14 |
| 3,390,734 | A | * | 7/1968 | Sheerin | .................... 180/89.14 |
| 3,765,500 | A | * | 10/1973 | Reeves | ..................... 180/89.15 |
| 3,831,999 | A | * | 8/1974 | Sonneborn | ............... 180/89.14 |
| 3,944,017 | A | * | 3/1976 | Foster | .................... 296/190.07 |
| 3,958,659 | A | * | 5/1976 | Selman | ................... 296/190.07 |
| 4,436,169 | A | * | 3/1984 | Jennerjohn et al. | ..... 296/190.05 |
| 4,452,329 | A | * | 6/1984 | Stone et al. | ........... 296/190.07 |
| 5,253,853 | A | * | 10/1993 | Conaway et al. | ......... 180/89.15 |
| 6,439,651 | B1 | * | 8/2002 | Johansson et al. | ..... 296/190.07 |
| 6,540,038 | B1 | * | 4/2003 | Taylor et al. | .......... 296/190.07 |

(Continued)

FOREIGN PATENT DOCUMENTS

AT          403 365 B          1/1998

(Continued)

OTHER PUBLICATIONS

European Office Action dated Jun. 1, 2006 with English translation (Twenty-three (23) Pages).

*Primary Examiner*—Kiran B. Patel
(74) *Attorney, Agent, or Firm*—Crowell & Moring LLP

(57) ABSTRACT

For the creation of a retainer is created between the driver's cab and the frame of a vehicle with a spring-loaded support that permits the displacement driver's cab, and with a connecting element by way of which the driver-side support connects to the frame, such retainer to ensure highest possible occupant safety as well as the safety of third parties while permitting low-cost production, a catch plate is proposed one end of which is attached to the connecting element while its other end is attached to the frame is proposed.

17 Claims, 4 Drawing Sheets

U.S. PATENT DOCUMENTS

2005/0225119 A1 * 10/2005 Bollinger et al. ...... 296/190.07

FOREIGN PATENT DOCUMENTS

| DE | 4413414 A1 | 10/1995 |
| DE | 196 12 502 A1 | 10/1997 |
| DE | 19831314 A1 | 1/2000 |
| EP | 0 972 699 B1 | 1/2000 |
| JP | 8-230724 | 9/1996 |
| WO | WO 00/18633 | 4/2000 |

* cited by examiner

LINKAGE FOR A DRIVER'S CAB

BACKGROUND AND SUMMARY OF THE INVENTION

This invention relates to a retainer between a driver's cab and the frame of a vehicle.

Vehicle safety has become an important objective in the design of commercial vehicles. One of the major aspects is the configuration of the retainer between the driver's cab and the frame of the vehicle. An analysis of actual accident history shows that the accidents that require critical attention in the design of a driver's cab and the associated cab support typically involve the rear-ending of another truck. The situation is particularly serious when the frame or chassis systems of the colliding vehicles extend at different levels, since in any such case the energy of the impact is not channeled directly into the frame system of either vehicle but instead strikes the components above and/or below the frame. A direct transfer of the impact energy into the frame system is the exception rather than the rule. A driver's cab takes a particular punishment when the frame, body or trailer platform of the vehicle ahead of it is higher than that of the vehicle behind.

German publication DE 198 31 314 A1 describes a retainer between a driver's cab and the frame of a vehicle that features a spring-loaded base, allowing the driver's cab to tilt. That retainer also includes a connecting element that connects the support to the frame. In that earlier design, the connecting element consists of several components. These include a spring retainer arm and, next to the spring retainer arm, a multi-part restraining element with a longitudinal arm and, connected to it, a swivel bracket. The multi-part restraining element is so designed that in the event of a collision it is deformed in energy-absorbing fashion under maximized retention of the connection between the driver's cab and the frame.

One drawback of that earlier design lies in the complexity of its production and thus its high cost. Several components need to be fabricated and assembled. Moreover, the materials used for the individual components and their shape must be so chosen that, when deformed by an impact, they have the desired energy-absorbing effect and the deformation occurs in the manner intended. To that end, the longitudinal arm is slightly bent toward the top and—viewed from above—uneven. The swivel bracket is provided with specific indentations.

Against that background it is the objective of this invention to introduce a retainer between a driver's cab and the frame of a vehicle that assures optimized occupant safety as well as best possible protection of third parties, while at the same time being inexpensive to make.

Based on the invention, this objective is achieved with a retainer between a driver's cab and the frame of a vehicle incorporating the features claimed.

Accordingly, the invention is characterized by a catch plate having one end which is attached to the connecting element while its other end is attached to the frame. The catch plate constitutes another connection, in addition to the connecting element, between the driver's cab and the frame and, while not exposed to any significant load during normal operation, it serves in a collision to transfer the forces impinging on the driver's cab or its support to the frame, to crumple and to assure a dependable connection between the driver's cab and the frame. In other words, the catch plate moves the cab in controlled fashion until it can no longer prevent an object forcing its way in due to a collision from reaching the engine block. The solution offered by this invention minimizes the risk of a complete separation of the cab from the frame. That translates into enhanced occupant safety as well as reduced potential danger to others since the cab is retained on the frame even after the impact. Moreover, it reduces any potential danger to others.

Another aspect of the invention is the simplicity of producing the catch plate because of its single-part design. A further advantage in terms of cost lies in the fact that the surrounding structure requires only minor modifications since only one additional component, the catch plate itself, needs to be produced and installed.

In one form of implementation, the junction between the catch plate and the frame, as viewed from the front, is located behind a junction between the connecting element and the frame. This has the effect that, after the frame-side connection of the support has failed, the crumpling of the catch plates gives the driver's cab enough room to shift backward. In the process the plates are not exposed to an excessive tensile load but instead they fold along a defined pattern.

In another form of implementation the catch plate is configured in the longitudinal direction in such fashion that, again when viewed from the front, the junction between the catch plate and the frame is closer to the center than the junction between the connecting element and the frame. This again allows the plates to crumple along a particular pattern.

The catch plate may consist for instance of a stamped metal blank, making it easy and inexpensive to produce. It can be die-stamped or bent into the desired shape, obviating in its manufacture the need—unlike cast-metal components—for specially produced molds.

The catch plate may consist of a highly ductile material. The advantage of that is that the material is at once tough and very tractile. These properties are offered for instance by steel type S500MC (steel EN10149, material classification number 1.0984). In the event of an impact, these material properties make for good deformation or crumpling characteristics of the catch plate without exceeding the failure threshold. As a result, the connecting element remains attached to the frame as long as possible, ensuring the retention of the driver's cab on the frame, i.e. the cab is prevented from separating from the frame. Moreover, as the catch plate crumples, it absorbs part of the impact energy, so that only a reduced portion of that energy needs to be transferred into the frame. Simulations have established that about 13% of the original impact energy can be absorbed through the deformation of the catch plate. The actual energy absorption takes place the moment no further rearward shift of the cab is possible or the incoming object has penetrated all the way to the engine block.

The catch plate may be of essentially uniform width over its full length. Its ends may be rounded. The catch plate may be provided with drill holes to accommodate appropriate fasteners. A console may be positioned between the connecting element and the frame. The console serves as an adapter between the support and thus the entire driver's cab and the frame. Its top end accommodates the base, and its bottom end connects to the frame.

The console may consist of a nonductile material with properties such as those of the GGG60 cast metal. The relatively limited tractility of that material has been selected to ensure that the console gives way in the event of a collision.

The console may be connected to the frame at two mutually remote points, one behind the other as viewed from the front. For that purpose the console may have two legs in an inverted V-configuration, converging at the top.

If a console of that type is provided between the connecting element and the frame, the catch plate can extend from the junction between the connecting element and the console all the way to a junction between the console and the frame.

The structural design is particularly simple when the catch plate extends essentially parallel to one of the console legs. This makes it possible to attach the catch plate and the console to the connecting element and, respectively, to the frame using the same fasteners, with an appropriately beneficial effect on the manufacturing cost.

The following will explain this invention in more detail with the aid of the examples illustrated in the attached drawings.

DETAILED DESCRIPTION OF THE INVENTION

Figure 1:
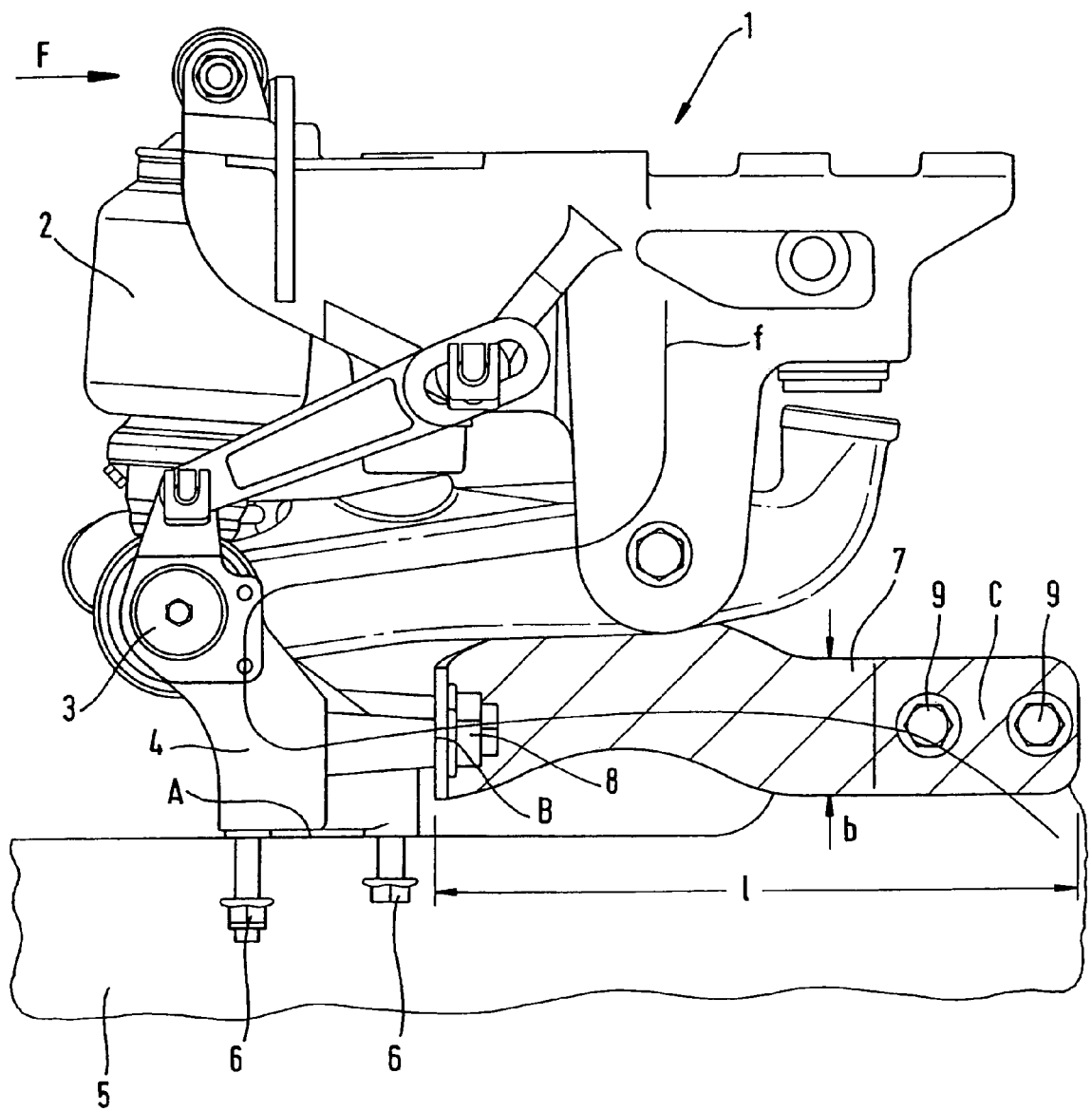
FIG. 1 is a lateral view of a driver's cab retainer according to the invention.

FIG. 1 depicts a retainer according to this invention. Two such retainers are usually provided in a vehicle, one on each side of the cab. In FIGS. 1 and 3, the left-hand side of the illustration points toward the front of the vehicle; the illustrations in FIGS. 2 and 4 represent the left-hand retainer of the cab as viewed from the front.

The retainer includes a support assembly 1. The support assembly incorporates, among other components, a spring-loaded leg 2. The bottom end of the spring-loaded leg features a pivot bearing 3 by way of which the cab is attached in tiltable fashion. The support assembly is not depicted in more detail since it is of a conventional design and is not a relevant factor in the invention.

Through junction A at its lower end, the support 1 is attached to a connecting element 4. This connecting element 4 attaches the support to a vehicle frame 5, which in FIGS. 1 and 3 is schematically outlined only. In the example shown, the connecting element 4 is a forged-metal component, attached to the frame 5 by means of machine screws 6. There are four such screws as indicated in the front view of FIG. 2.

Figure 2:
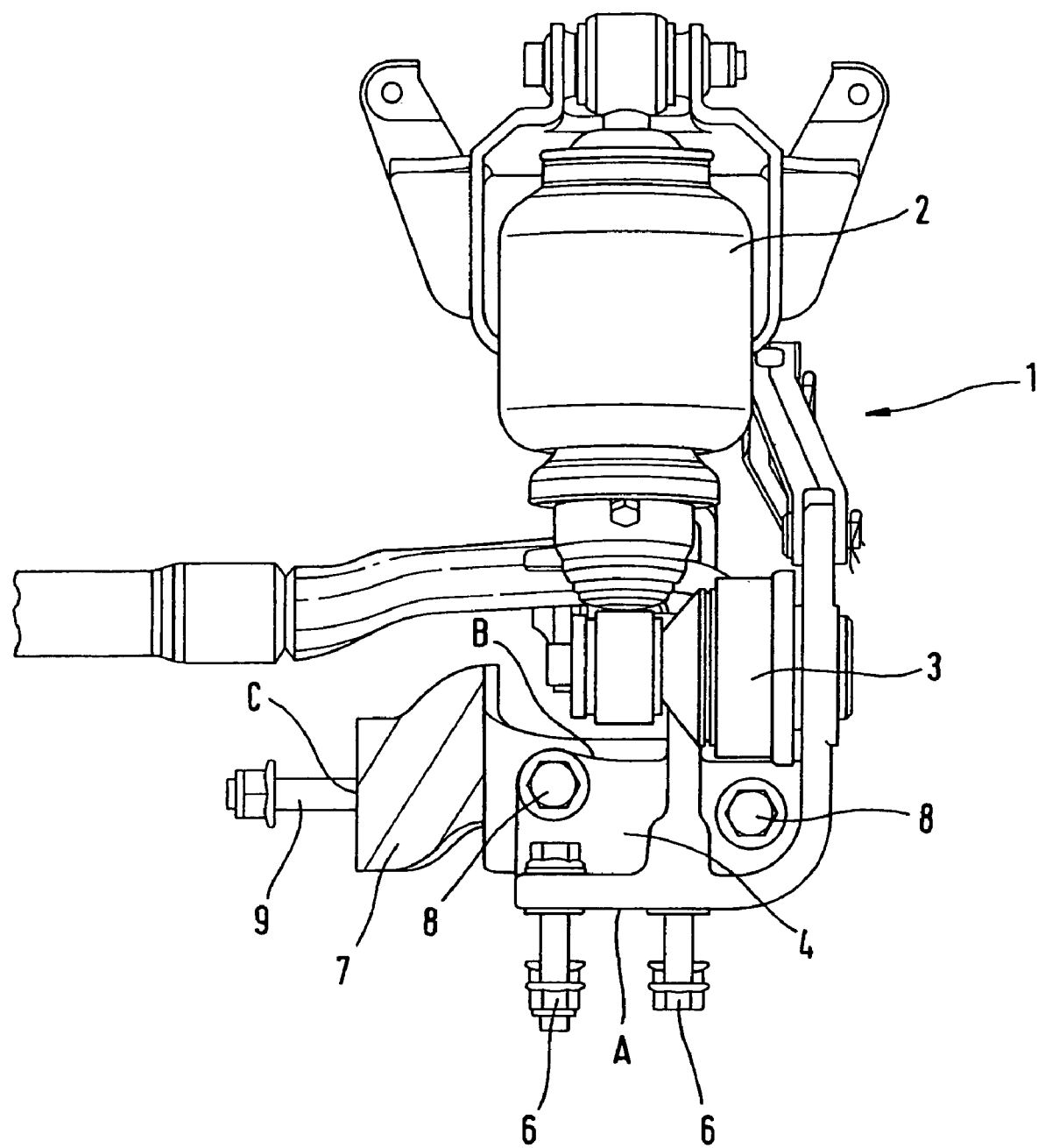
FIG. 2 is a front view of the novel driver's cab retainer shown in FIG. 1.
Figure 3:
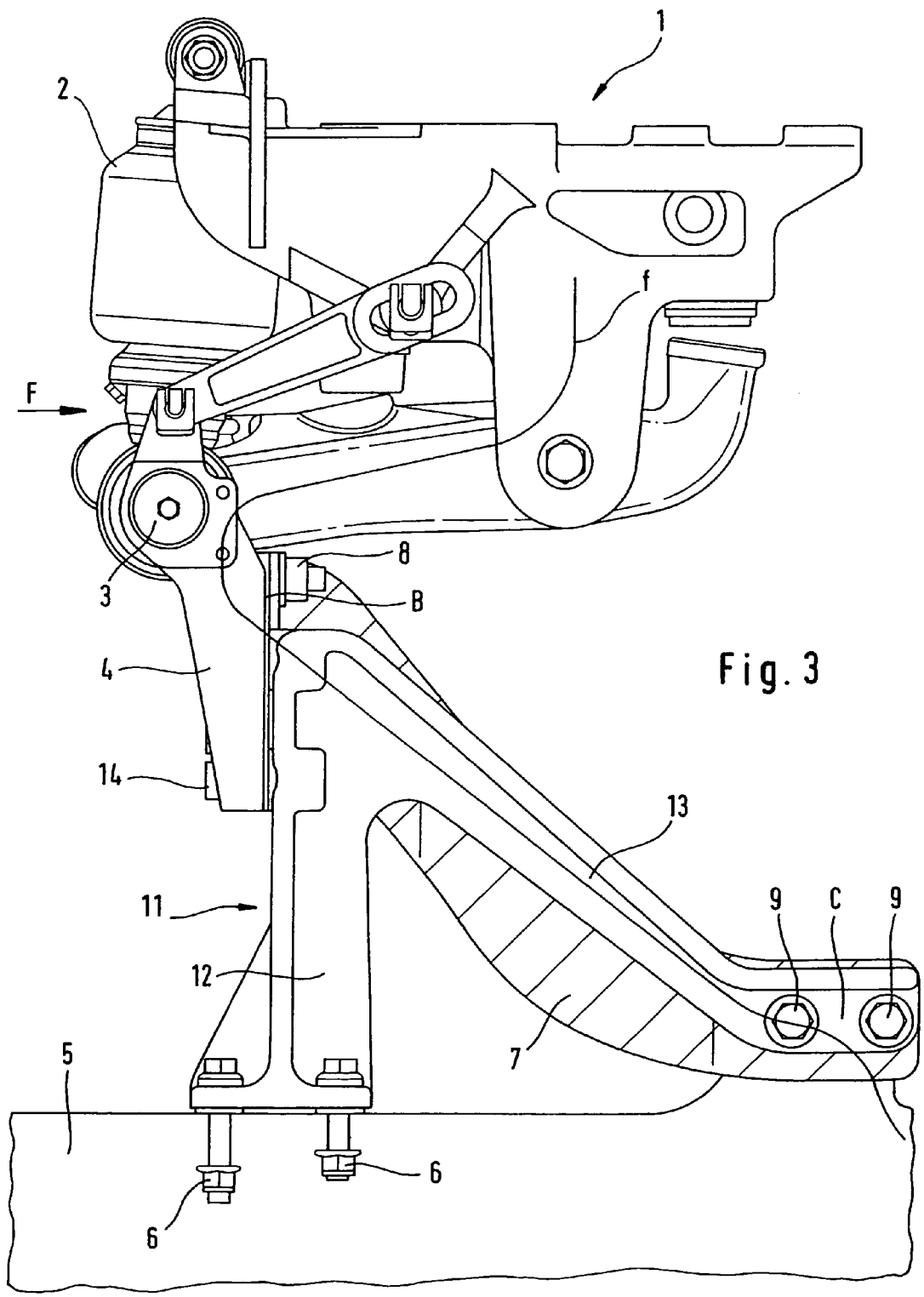
FIG. 3 is a side view of a vehicle driver's cab retainer according to the invention, with a console raising the cab.
Figure 4:
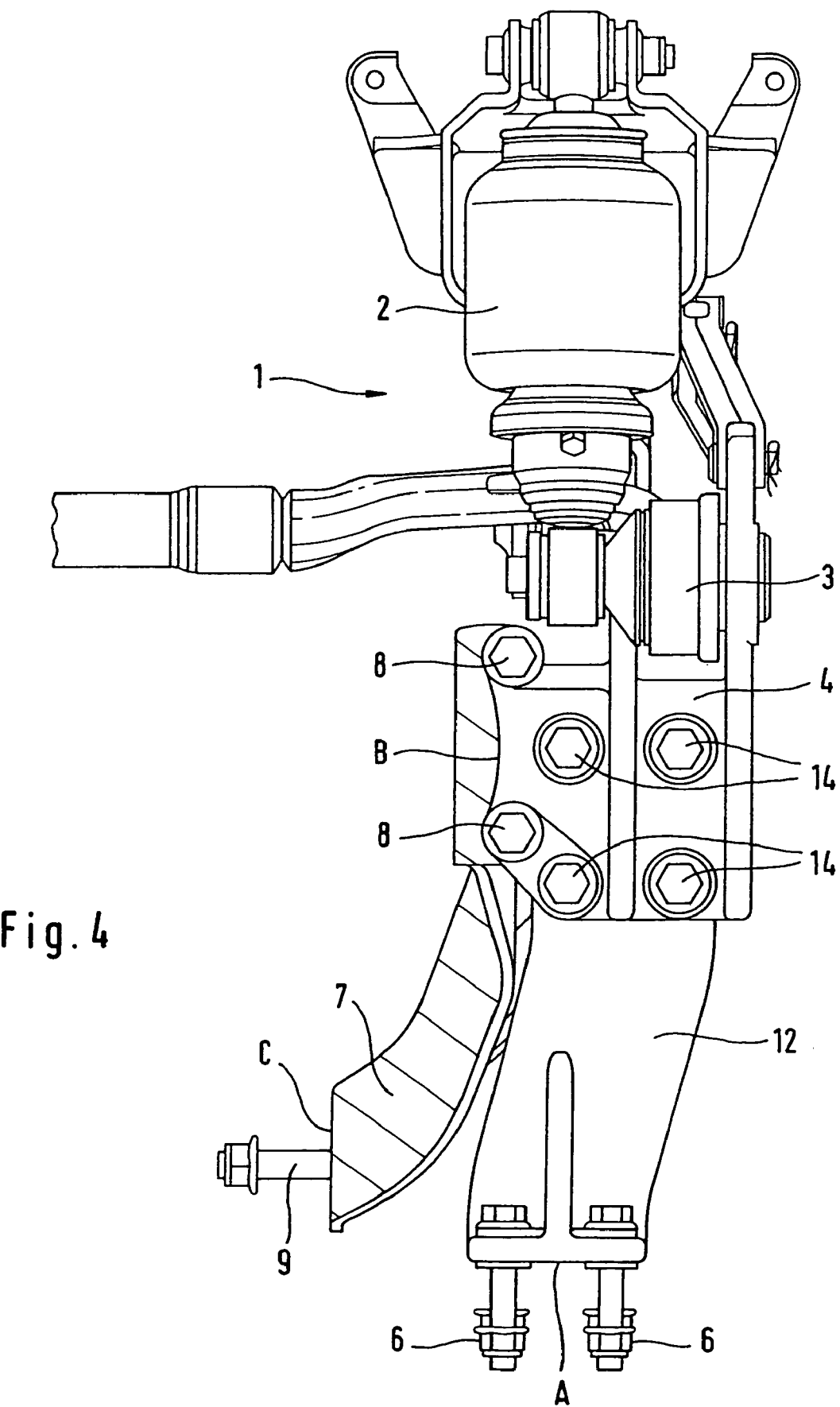
FIG. 4 is a front view of the novel retainer shown in FIG. 3.

In FIGS. 1 to 4 a catch plate 7 is shown in a cross-hatched illustration. The cross-hatch representation serves for facilitated identification of this component rather than suggesting a cross-sectional view. The catch plate 7 consists of a curved metal strip that is of essentially uniform width b over its entire length l. Its ends are rounded and are each provided with two drill holes for accepting fasteners 8, 9. The forward end of the catch plate 7 is attached via screws 8 to the connecting element 4 at junction B. As can be seen in FIG. 2, two machine screws 8 are used for that connection. Screws 9 attach its rearward end to the frame 5 at junction C.

Viewed from the side in FIG. 1, the catch plate 7 exhibits a slightly curved contour. Between its two terminal junctions B, C, positioned at approximately the same level, the catch plate 7 is slightly cambered.

As shown in the frontal view of FIG. 2, the catch plate 7 is curved in the longitudinal direction as well. The junction C between the catch plate 7 and the frame 5 is not situated on the same line as the junction B between the catch plate 7 and the connecting element 4 but is closer to the center of the vehicle.

The example illustrated in FIG. 3 differs from the design described above only in that the connecting element 4 is not attached directly to the frame 5 but connects to the frame 5 via a console 11. The console 11, in this case a cast-metal part, is V-shaped and is mounted as an inverted V. It has two legs, 12 and 13, with the leg 12 pointing in the forward direction and the leg 13 pointing in the aft direction, both legs converging near junction B. At junction B, the upward pointing end of the console 11 is bolted to the connecting element 4 by means of four machine screws 14. At junction A, the leg 12 is attached to the frame 5 by means of screws 6 while the leg 13 is attached to the frame 5 at junction C by means of two screws 9.

The catch plate 7 is again identified by a cross-hatch. In this design example, it extends essentially parallel to the rearward pointing leg 13. At junction B its forward end is attached to the catch plate 4 by means of two screws 8 while its rearward end is attached to the frame 5 at junction C by means of two screws 9. The catch plate 7 is located inside the retainer 1, meaning that it bounds on the side of the leg 13 that faces the center of the vehicle.

As can be seen in the lateral view of FIG. 3, the junction B between the catch plate 7 and the connecting element 4 and the junction C between the catch plate 7 and the frame 5 are situated at different levels, and catch plate 7 is S-shaped. As in the case of the catch plate 7 in the preceding implementation example, the catch plate 7 is again configured in such fashion that, viewed from the front, the junction C between the catch plate 7 and the frame 5 is located closer to the center of the vehicle than the junction A between the console 11 and the frame 5 and the junction B between the catch plate 7 and the connecting element 4.

In both examples the catch plate 7 consists of a highly ductile material. Unlike the connecting elements 4 it is therefore easily deformed without reaching a failure threshold.

The following will explain the way in which the retainer of this invention functions in the event of a collision: When at the level of the retainer a force impinges in the direction of the arrow F in FIGS. 1 and 3, that force is initially transferred along the line f through the support 1 and into the connecting element 4. The screws 6 are so dimensioned that they fail once a predefined force limit has been exceeded. As a consequence, the force is then transferred from the connecting element 4 via the junction B into the catch plate 7 and from there via the junction C into the frame 5. As the screws 6 fail, the driver's cab is still connected to the frame 5 via the catch plate 7. The inbound force F pushes the cab backward, causing the catch plate 7 to crumple. That deformation or crumpling action absorbs part of the energy of force F. The catch plate 7 is so designed that its connection is retained as long as possible so that the cab is displaced in controlled fashion and a complete separation of the cab is avoided.

In the case of the example illustrated in FIGS. 3 and 4, the impact energy introduced at the level of the arrow F is initially transferred along the line f into the connecting element 4. When a predefined force level is exceeded, the screws 6 and/or the brittle leg 12 or 13 of the console 11 will fail, transferring the energy F from the connecting element 4 via the junction B into the catch plate 7 and from there via the junction C into the frame 5. In this example as well, the driver's cab is still connected to the frame 5 by way of the catch plate 7. The rearward movement of the cab causes the catch plate 7 to be deformed, whereby the displacement takes place in controlled fashion.

The invention claimed is:

1. A retainer for a driver's cab on a frame of a vehicle, comprising:
 a spring-loaded support designed to permit displacement of the driver's cab,
 a connecting element through which a connection is established between the support and the frame, and
 a catch plate having one end thereof attached to the connecting element and another end thereof attached to the frame,
 wherein a junction between the catch plate and the frame, as viewed from the front, is situated behind a junction between the connecting element and the frame, and
 wherein, in its longitudinal direction, the catch plate is so designed that, viewed from the front, a junction between the catch plate and the frame is situated closer to the center of the vehicle than a junction between the connecting element and the frame.

2. The retainer for a driver's cab as claimed in claim 1, wherein the catch plate is made from a metal blank.

3. The retainer for a driver's cab as claimed in claim 1, wherein the catch plate consists of a highly ductile material.

4. The retainer for a driver's cab as claimed in claim 1, wherein the catch plate has an essentially uniform width over its entire length.

5. The retainer for a driver's cab as claimed in claim 1, wherein the ends of the catch plate are rounded.

6. The retainer for a driver's cab as claimed in claim 1, wherein the catch plate is provided with drill holes designed to accept fasteners.

7. The retainer for a driver's cab as claimed in claim 1, and further comprising a console provided between the connecting element and the frame.

8. The retainer for a driver's cab as claimed in claim 7, wherein the console is connected to the frame at two mutually spaced-apart locations.

9. The retainer for a driver's cab as claimed in claim 7, wherein the console features two legs.

10. The retainer for a driver's cab as claimed in claim 7, wherein the console consists of a material with brittle properties.

11. The retainer for a driver's cab as claimed in claim 7, wherein the catch plate extends from a junction between the connecting element and the console to a junction between the console and the frame.

12. The retainer for a driver's cab as claimed in claim 9, wherein the catch plate extends essentially parallel to one of the legs of the console.

13. The retainer for a driver's cab as claimed in claim 7, wherein the catch plate is made from a metal blank.

14. The retainer for a driver's cab as claimed in claim 7, wherein the catch plate consists of a highly ductile material.

15. The retainer for a driver's cab as claimed in claim 7, wherein the catch plate has an essentially uniform width over its entire length.

16. The retainer for a driver's cab as claimed in claim 7, wherein the ends of the catch plate are rounded.

17. The retainer for a driver's cab as claimed in claim 7, wherein the catch plate is provided with drill holes designed to accept fasteners.

* * * * *